US009439139B2

(12) United States Patent
Kwak et al.

(10) Patent No.: US 9,439,139 B2
(45) Date of Patent: Sep. 6, 2016

(54) METHOD AND APPARATUS FOR CONTROLLING OPERATION STATE OF BASE STATION IN WIRELESS COMMUNICATION SYSTEM

(71) Applicant: Samsung Electronics Co., Ltd., Gyeonggi-do (KR)

(72) Inventors: Yongjun Kwak, Gyeonggi-do (KR); Youngbum Kim, Seoul (KR); Joonyoung Cho, Gyeonggi-do (KR); Younsun Kim, Gyeonggi-do (KR); Juho Lee, Gyeonggi-do (KR); Hyoungju Ji, Seoul (KR)

(73) Assignee: Samsung Electronics Co., Ltd (KR)

( * ) Notice: Subject to any disclaimer, the term of this patent is extended or adjusted under 35 U.S.C. 154(b) by 91 days.

(21) Appl. No.: 14/079,260

(22) Filed: Nov. 13, 2013

(65) Prior Publication Data
US 2014/0134993 A1 May 15, 2014

(30) Foreign Application Priority Data
Nov. 13, 2012 (KR) .................. 10-2012-0127878

(51) Int. Cl.
*H04W 52/02* (2009.01)
*H04W 24/00* (2009.01)
*H04W 48/16* (2009.01)

(52) U.S. Cl.
CPC ......... *H04W 52/0206* (2013.01); *H04W 24/00* (2013.01); *H04W 48/16* (2013.01)

(58) Field of Classification Search
CPC ... H04W 88/06; H04W 24/02; H04W 24/04; H04W 48/08; H04W 52/02; H04W 52/0206; H04M 1/72569; H04M 1/72577; H04M 15/88; H04M 1/72522
USPC ............... 455/418–420, 500, 501
See application file for complete search history.

(56) References Cited

U.S. PATENT DOCUMENTS

| 2009/0252073 | A1* | 10/2009 | Kim .................. | H04W 52/0206 370/311 |
| 2009/0253461 | A1* | 10/2009 | Kuwahara ..................... | 455/561 |
| 2009/0285143 | A1* | 11/2009 | Kwun ............... | H04W 52/0229 370/311 |
| 2011/0092215 | A1* | 4/2011 | Back ..................... | H04W 24/02 455/444 |
| 2011/0092234 | A1* | 4/2011 | Kim et al. .................... | 455/507 |
| 2011/0105123 | A1 | 5/2011 | Lee et al. | |

(Continued)

FOREIGN PATENT DOCUMENTS

| KR | 1020110081092 | 7/2011 |
| KR | 1020120094379 | 8/2012 |
| WO | WO 2010/005180 | 1/2010 |

OTHER PUBLICATIONS

European Search Report dated Jun. 7, 2016 issued in counterpart application No. 13855027.2-1855, 6 pages.

*Primary Examiner* — Magdi Elhag
(74) *Attorney, Agent, or Firm* — The Farrell Law Firm, P.C.

(57) ABSTRACT

Methods and apparatus are provided for controlling transition of an operation state of a cell in a wireless communication system. The cell includes a transceiver configured to transmit and receive signals to and from a terminal and another cell. The cell also includes a controller configured to transition an operation state of the cell from an active state to a dormant state, transmit a discovery signal, determine whether a cell activation signal is received from a node that controls the cell, and transition the operation state of the cell from the dormant state to the active state when the cell activation signal is received.

12 Claims, 16 Drawing Sheets

(56) References Cited

U.S. PATENT DOCUMENTS

| | | | |
|---|---|---|---|
| 2011/0122803 A1* | 5/2011 | Ahn | H04L 12/12 |
| | | | 370/311 |
| 2011/0275378 A1* | 11/2011 | Kwon et al. | 455/437 |
| 2012/0106423 A1* | 5/2012 | Nylander | H04W 52/0241 |
| | | | 370/311 |
| 2012/0142392 A1* | 6/2012 | Patel et al. | 455/522 |
| 2012/0165063 A1 | 6/2012 | Scalia et al. | |
| 2012/0182965 A1 | 7/2012 | Das et al. | |
| 2013/0235778 A1* | 9/2013 | Maeder et al. | 370/311 |
| 2014/0080488 A1* | 3/2014 | Michel et al. | 455/436 |
| 2015/0271738 A1* | 9/2015 | Cheng | H04W 16/24 |
| | | | 455/422.1 |

\* cited by examiner

METHOD AND APPARATUS FOR CONTROLLING OPERATION STATE OF BASE STATION IN WIRELESS COMMUNICATION SYSTEM

PRIORITY

This application claims priority under 35 U.S.C. 119(a) to an application filed in the Korean Intellectual Property Office on Nov. 13, 2012, and assigned Serial No. 10-2012-0127878, the contents of which are incorporated herein by reference.

BACKGROUND OF THE INVENTION

1. Field of the Invention

The present invention relates generally to a wireless mobile communication system and, more particularly, to an instruction for transition to a sleep state at the base station for conserving transmit power and operations of the base station and a terminal for supporting transition between the active and sleep states of the base station.

2. Description of the Related Art

In the field of wireless mobile communication, reducing the transmit/receive power of the base station is a frequently raised issue, and there have been efforts to reduce power consumption of the base station in a Long Term Evolution (LTE) communication system, which is one of the mostly widely utilized communication systems. One approach of reducing the power consumption of the base station is to introduce the concept of a dormant state, which the base station enters when there is no terminal connected thereto, so as to stop unnecessary transmissions of a common channel, resulting in power conservation. The base station transitions between the active and dormant states depending on the situation. The terms 'active state' and 'dormant state' may be interchanged with other terms having the same meanings In the present disclosure, the term 'dormant state' denotes a state in which the base station suspends transmission of the common channel such as, for example, a Common Reference Signal (CRS), and the term 'active state' denotes a state in which the base station is capable of transmitting/receiving all types of channels.

In LTE, the deployment of a plurality of small cells in the shadow area of a macro cell is very useful in reducing the load of the macro cell and facilitating service to a high density of mobile terminals. In such a hotspot area, the density of terminals varies significantly depending on the time of day, such that the load of the macro cell increases at a time when people gathers such as, for example, day time or evening, resulting in degradation in service quality. Accordingly, if a plurality of small cells is deployed within the macro cell, especially at that time when the density of terminals increases, the service quality to the terminals may be maintained. During times such as late night or dawn, when the number of terminals decreases in the hotspot, the macro cell may be able to serve all of the terminals within its coverage without assistance from the small cells. When the number of terminals serving within the hotspot is small, maintaining the small cells in an active state is not necessary, and thus, it is preferred that the small cells enter the dormant state to prevent unnecessary power consumption.

FIG. 1 is a diagram illustrating states of small cells within a macro cell. A macro cell 102 is under the control of a base station 101 and includes a plurality of small cells 103 to 109. In the situation illustrated in FIG. 1, the terminals are gathered in the coverage areas of the small cells 103, 104, 105, and 106, and it is advantageous for the small cells 103, 104, 105, and 106 to stay in the active state for the purpose of load balancing from the view point of the base station 101. However, it is not necessary for the small cells 107, 108, and 109, which have no terminals to serve, to stay in the active state. In the case of FIG. 1, it is advantageous to control the small cells 107, 108, and 109 to enter the dormant state from the view point of energy conservation of the base station.

If the small cells, which are deployed in a hotspot, transition between the active and dormant states depending on the number of terminals to serve and/or a data load amount of the hotspot, it is possible to conserve the power of the small cells, which is otherwise unnecessarily consumed in the conventional system.

SUMMARY OF THE INVENTION

The present invention has been made to address at least the above problems and/or disadvantages and to provide at least the advantages described below. Accordingly, an aspect of the present invention provides a cell management method and apparatus of a base station for efficiently transitioning the operation state of a cell between the active and dormant states, and operation methods and apparatuses of the base station and terminal for supporting the state transition procedure of the cell.

In accordance with an aspect of the present invention, a method is provided for deactivating a cell in a wireless communication system. The cell determines whether a condition for deactivating the cell operating in an active state is fulfilled. The cell transitions the active state of the cell to a dormant state, when the condition is fulfilled.

In accordance with another aspect of the present invention, a method is provided for deactivating a cell in a wireless communication system. The cell generates information on terminals served by the cell in an active state. The cell transmits the information on the terminals served by the cell to a node that controls the cell. The cell receives state control information for controlling operation of the cell from the node. The cell configures an operation state of the cell according to the state control information.

In accordance with another aspect of the present invention, a method is provided for activating a cell in a wireless communication system. The cell transitions an operation state of the cell from an active state to a dormant state. The cell transmits a discovery signal. The cell determines whether a cell activation signal is received from a node that controls the cell. The cell transitions the operation state of the cell from the dormant state to the active state, when the cell activation signal is received at the cell.

In accordance with another aspect of the present invention, a method is provided for activating a cell at a terminal in a wireless communication system. The terminal receives control information for use in acquiring a discovery signal of the cell from a service cell. The terminal receives the discovery signal transmitted by the cell based on the control information. The terminal generates neighbor cell measurement information based on the discovery signal. The terminal transmits the neighbor cell information to the serving cell. The cell operates in one of an active state and a dormant state based on the neighbor cell information.

In accordance with another aspect of the present invention, a method is provided for activating a cell at a serving cell in a wireless communication system. The serving cell receives neighbor cell measurement information from a terminal served by the serving cell. The serving cell checks a state of the cell based on the neighbor cell measurement information. The serving cell determines whether to activate the cell, when the cell is in a dormant state. The serving cell transmits an activation message to the cell, when it is determined to activate the cell.

In accordance with another aspect of the present invention, a method is provided for activating a cell a terminal in a wireless communication system. The terminal receives a discovery signal transmitted by the cell. The terminal determines whether the cell is in an active state or a dormant state based on the discovery signal. The terminal determines whether the cell is required to be activated, when the cell is in the dormant state. The terminal transmits an activation signal to the cell, when the cell is required to be activated.

In accordance with another aspect of the present invention, a cell in a wireless communication system is provided. The cell includes a transceiver configured to transmit and receive signals to and from a terminal and another cell. The cell also includes a controller configured to transition an operation state of the cell from an active state to a dormant state, transmit a discovery signal, determine whether a cell activation signal is received from a node that controls the cell, and transition the operation state of the cell from the dormant state to the active state when the cell activation signal is received.

In accordance with another aspect of the present invention, a terminal in a wireless communication system is provided. The terminal includes a transceiver configured to transmit and receive signals. The terminal also includes a controller configured to control reception of control information for use in acquiring a discovery signal of a neighbor cell from a service cell, reception of the discovery signal transmitted by the neighbor cell based on the control information, generation of neighbor cell measurement information based on the discovery signal, and transmission of the neighbor cell information to the serving cell. The neighbor cell operates in one of an active state and a dormant state based on the neighbor cell information.

In accordance with another aspect of the present invention, a cell in a wireless communication system is provided. The cell includes a transceiver configured to transmit and receive signals to and from a terminal or another cell. The cell also includes a controller configured to control reception of neighbor cell measurement information from a terminal served by the cell, checking of a state of a neighbor cell based on the neighbor cell measurement information, determination of whether to activate the neighbor cell when the neighbor cell is in a dormant state, and transmission of an activation message to the neighbor cell when it is determined to activate the neighbor cell.

In accordance with still another aspect of the present invention, a terminal in a wireless communication system is provided. The terminal includes a transceiver configured to transmit and receive signals to and from the cell. The terminal also includes a controller configured to control reception of a discovery signal transmitted by the cell, determination of whether the cell is in an active state or a dormant state based on the discovery signal, determination of whether the cell is required to be activated when the cell is in the dormant state, and transmission of an activation signal to the cell when the cell is required to be activated.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
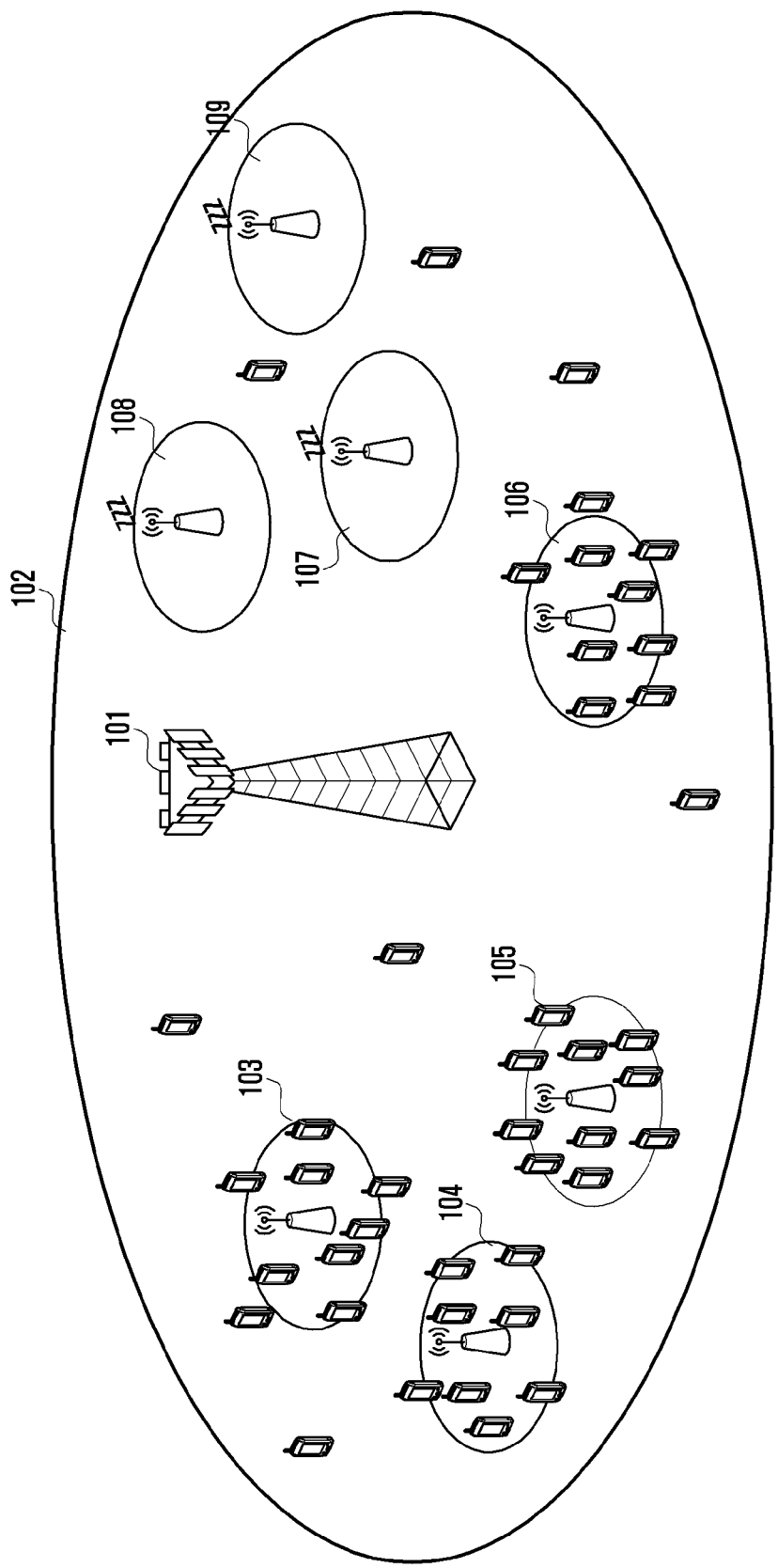
FIG. 1 is a diagram illustrating states of small cells within a macro cell.

Embodiments of the present invention are described in detail with reference to the accompanying drawings. The same or similar components may be designated by the same or similar reference numerals. Detailed descriptions of constructions or processes known in the art may be omitted to avoid obscuring the subject matter of the present invention. Further, terms are defined in consideration of the functionality in embodiments of the present invention, and may vary according to the intention of a user or an operator, usage, etc. Therefore, the definition should be made on the basis of the overall content of the present specification.

Although the description is directed to an Orthogonal Frequency-Division Multiplexing (OFDM)-based radio communication system, particularly the 3rd Generation Partnership Project (3GPP) Evolved Universal Mobile Telecommunications System (UMTS) Terrestrial Radio Access (EU-TRA), it will be understood by those skilled in the art that the present disclosure can be applied to other communication systems having the similar technical backgrounds and channel formats, with slight modification, without departing from the spirit and scope of the present invention.

In the following description, the terms 'base station' and 'cell' are interchangeably used and have the same meaning. The base station or cell may indicate a macro cell or a small cell, which is also referred to as a femto cell or pico cell.

As described above with respect to the conventional technology, a certain cell may operate in one of an active and a dormant states, and the cell in the active state may transition to the dormant state or vice versa. While the description of the conventional technology has been directed to the state transition of the small cell, the active and dormant states and state transition may be defined for all types of cells, including small and macro cells.

Figure 2:
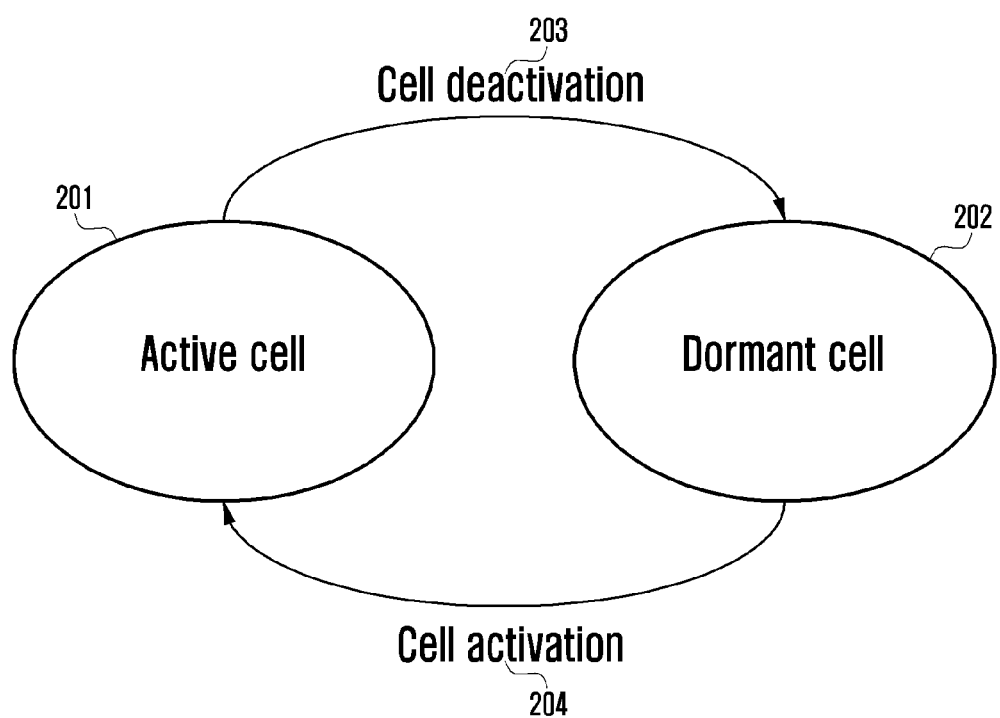
FIG. 2 is a diagram illustrating state transition of a cell, according to an embodiment of the present invention.

FIG. 2 is a diagram illustrating state transition of a cell, according to an embodiment of the present invention.

As shown in FIG. 2, a cell may operate in one of an active state 201 and a dormant state 202. The cell operating in the active state 201 may transition to the dormant state 202 through a deactivation procedure, as denoted by reference number 203. Also, the cell in the dormant state 202 may transition to the active state 201 through an activation procedure, as denoted by reference number 204.

Embodiments of the present invention propose the cell deactivation procedure 203 and the cell activation procedure 204. Various embodiments of the present invention propose methods, operations, and apparatuses necessary for these procedures.

A certain cell in an active state is capable of making a determination to transition to a dormant state according to the number of terminals it currently serves. Thus, the cell deactivation operation is simpler that the cell activation operation. The cell deactivation is classified into one of autonomous cell deactivation and network-controlled cell deactivation.

In the autonomous cell deactivation procedure, the cell operating in the active state autonomously transitions to the dormant state. The term 'autonomous' means that the state transition is performed without a cell deactivation command from the network or a control node.

The cell in the active state checks the number of terminals that it currently serves and, if the number of terminals is zero or less than a predetermined value over a predetermined time, the cell autonomously enters (or transitions to) the dormant state. The determination as to whether to transition to the dormant state may also consider information on a macro cell in which the cell is deployed or information on a neighbor cell, in addition to the number of terminals. If the small cell is positioned within the coverage area of the macro cell, or if the cell is managed (or controlled) by another base station, the cell may notify the macro cell or the other base station of the entry to the dormant state.

Figure 3:
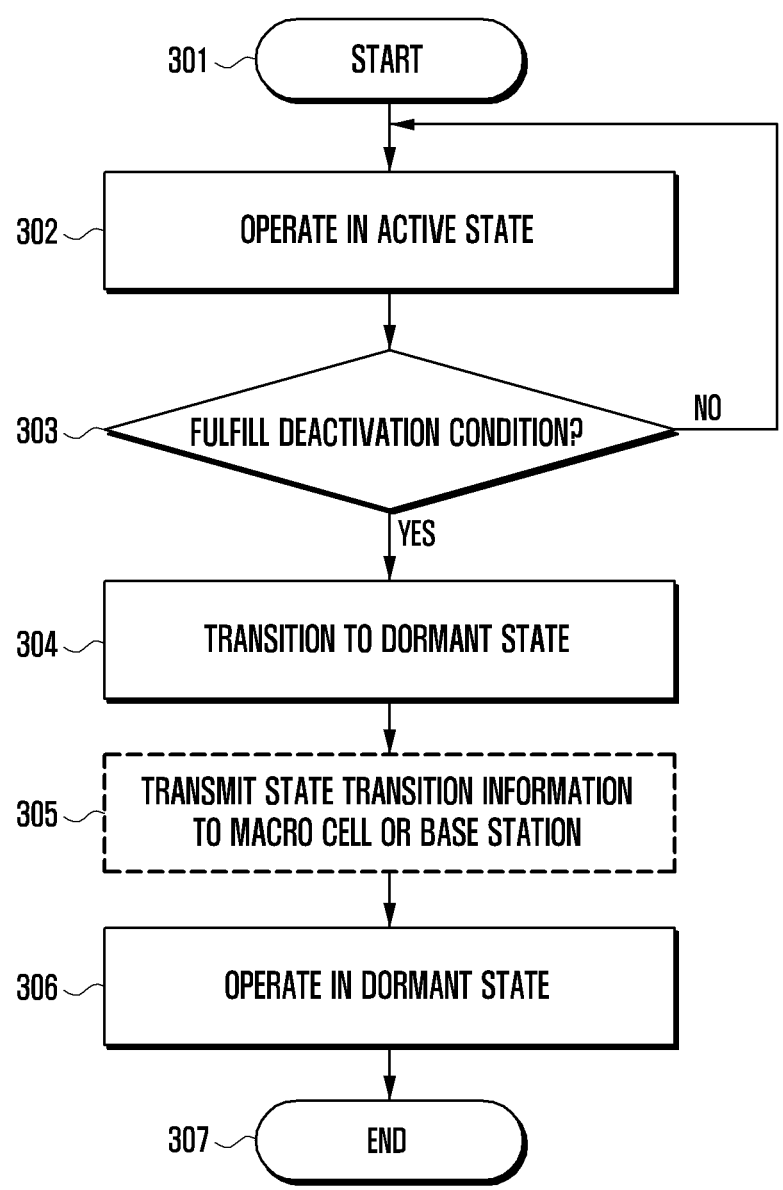
FIG. 3 is a flowchart illustrating an autonomous cell deactivation procedure, according to an embodiment of the present disclosure.

FIG. 3 is a flowchart illustrating the autonomous cell deactivation procedure, according to an embodiment of the present invention.

The autonomous cell deactivation procedure begins at step 301. The cell determines whether it operates in the active state, in step 302. Specifically, the cell in the active state serves the terminals within is service area.

The cell determines whether the deactivation condition is fulfilled based on the number of terminals, macro cell information, and neighbor cell information, in step 303. If the deactivation condition is not fulfilled, the cell remains in the active state. If the deactivation condition is fulfilled, the cell transitions its operating state from the active state to the dormant state, in step 304.

The cell notifies the macro cell or base station (evolved Node B or eNB) of the transition from the active state to the dormant state, in step 305. Step 305 may also be omitted from the methodology. The cell operates in the dormant state, in step 306, and the deactivation procedure ends, in step 307.

In network-controlled cell deactivation, the cell operating in the active state transitions to the dormant state under the control of the network.

A small cell (this procedure is not limited to the small cell but is applicable to a cell having a certain size) in the active state sends the macro cell (in this embodiment, the macro cell may denote the base station (eNB) controlling the small cell) information including a number of terminals that it currently serves, through a certain signaling process.

The signaling may be performed periodically or may be triggered when the number of terminals served by the small cell is less than a predetermined value.

If the information is received by the macro cell, the macro cell determines whether to control the small cell to remain in the active state or transition to the dormant state, and transmits the determination result to the small cell in the form of state control information. If the state control information is received from the macro cell, the small cell remains in the active state or transitions to the dormant state according to the state control information.

Figure 4:
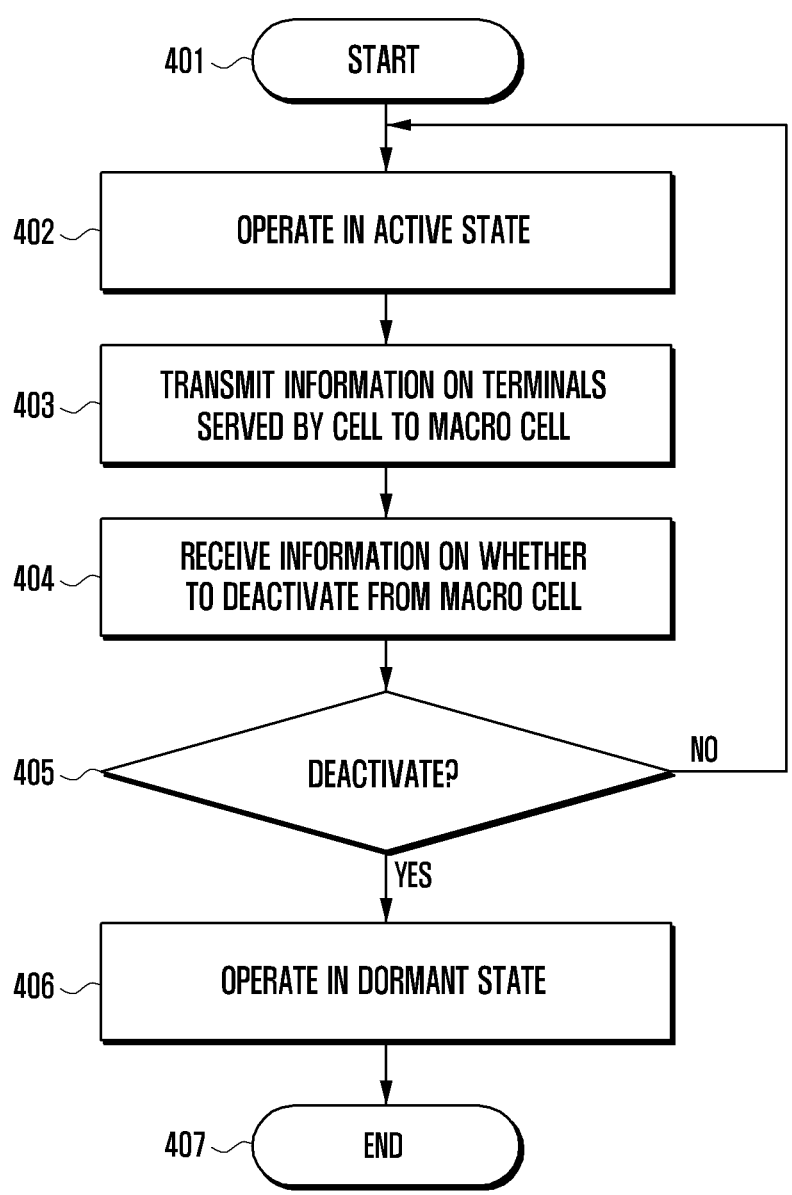
FIG. 4 is a flowchart illustrating operation of the small cell in the network-controlled cell deactivation procedure, according to an embodiment of the present invention.

FIG. 4 is a flowchart illustrating the operation of the small cell in the network-controlled cell deactivation procedure, according to an embodiment of the present invention.

The network-controlled cell deactivation procedure begins, in step operation 401. The small cell determines whether operates in the active state, in step 402, and sends information including the number of terminals that it serves, periodically or as necessary, in step 403.

The small cell receives state control information transmitted by the macro cell, in step 404. The state control information includes information indicating whether the small cell has to maintain the active state or transition to the dormant state.

In step 405, it is determined whether the small cell transitions to the dormant state. If the state control information indicates maintaining in the active state, the small cell maintains the active state, and the methodology returns to step 402. If the state control information indicates transitioning to the dormant state, the small cell transitions to the dormant state, in step 406, and the procedure ends, in step 407.

Figure 5:
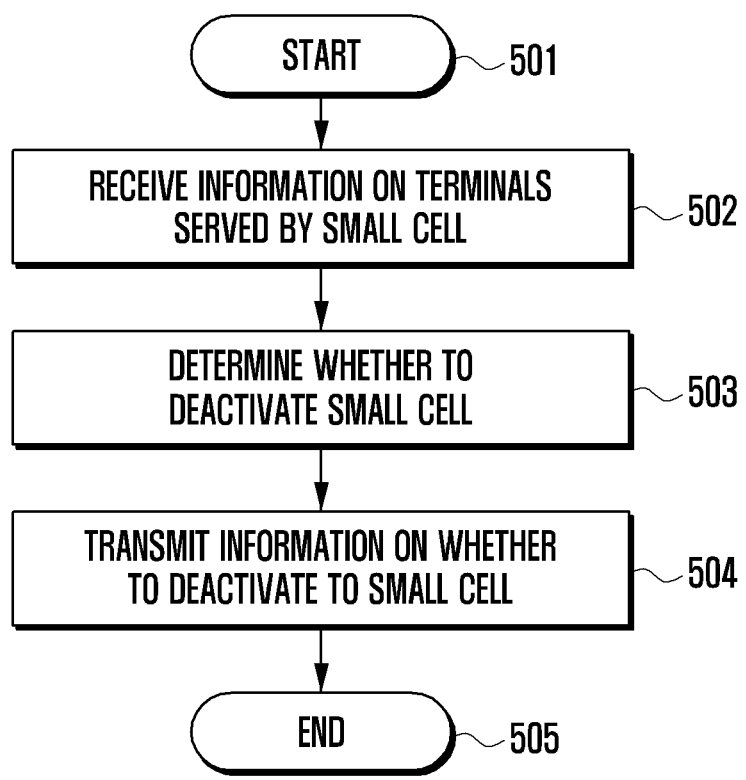
FIG. 5 is a flowchart illustrating the operation of the macro cell in the network-controlled cell deactivation procedure, according to an embodiment of the present invention.

FIG. 5 is a flowchart illustrating the operation of the macro cell in the network-controlled cell deactivation procedure, according to an embodiment of the present invention.

The network-controller cell deactivation procedure begins, in step 501. The macro cell receives information including a number of terminals served by a small cell, periodically or as necessary, from the small cell, in step 502.

The macro cell determines whether to maintain the active state of the small cell or to transition the active state of the small cell to the dormant state based on the information received from the small cell and the information stored in the macro cell, in step 503. The macro cell sends the state control information including the determination result to the small cell, in step 504, and the procedure ends, in step 505.

Since a cell in a dormant state has no terminal that it serves, and terminals within its service area cannot acquire information on the cell, it is not easy to define a condition for transitioning to an active state.

When the cell transitions its operation state to the active state, it is typical for new terminals to appear in the cell. However, if the cell has not transmitted/received any information in the dormant state, i.e., maintained a power-off state, it is difficult to check whether there are terminals to serve. Accordingly, although the cell is in the dormant state, it is necessary to check the existence of terminals within its service area while maximizing the effect of the dormant state, i.e., maximizing the power conservation effect, for a cell activation procedure.

According to an embodiment of the present invention, the cell in the dormant state intermittently transmits a new physical signal. This newly introduced signal is referred to as a discovery signal. The discovery signal can be used for the purpose of measuring a signal strength of the cell in the dormant mode and cell search.

In order to use the discovery signal for cell search, it is necessary to include cell ID information in the discovery signal. Accordingly, it is assumed that a terminal that receives the discovery signal is capable of checking the cell ID.

Figure 6:
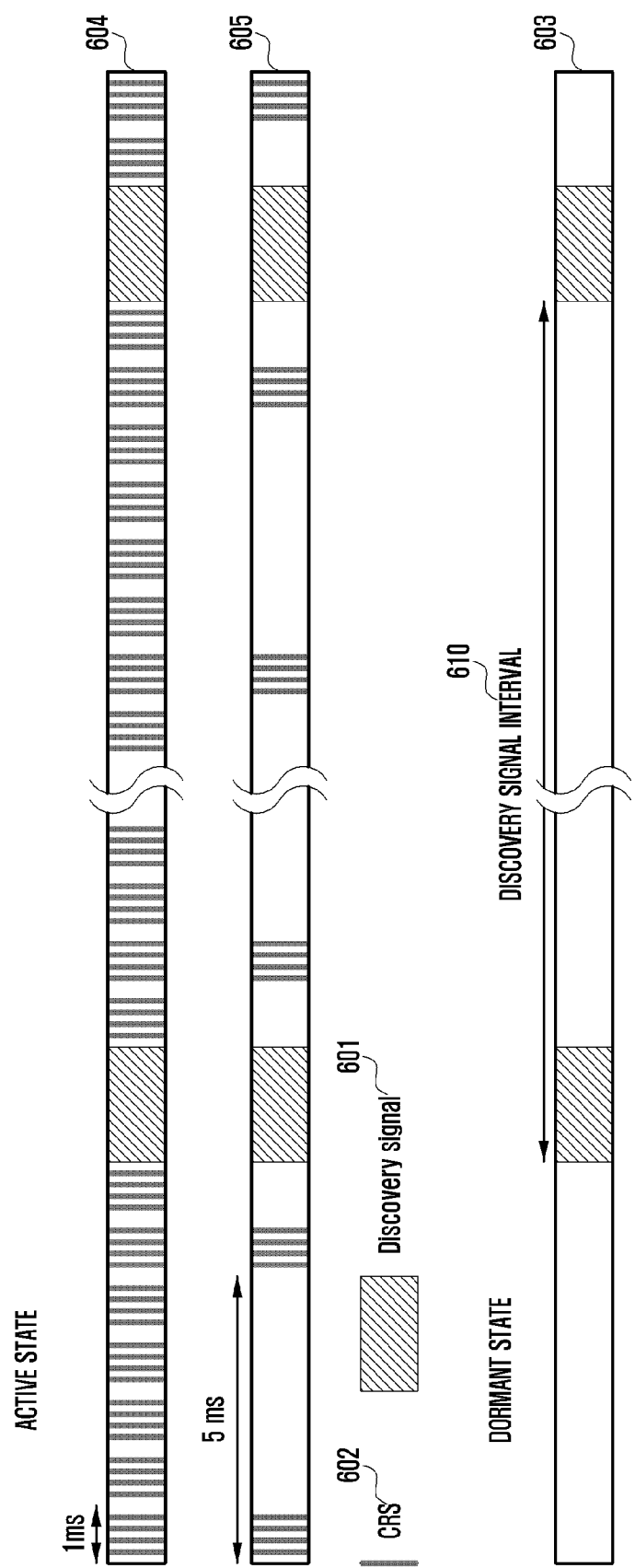
FIG. 6 is a diagram illustrating a format of the discover signal for use in the operation state control method, according to an embodiment of the present invention

FIG. 6 is a diagram illustrating a format of the discovery signal for use in the operation state control method, according to an embodiment of the present invention.

In FIG. 6, reference number 601 denotes a discovery signal, and reference number 603 denotes a transmission timing pattern of the discovery signal of the cell in the dormant state.

As denoted by reference number 603, the cell in the dormant state transmits the discovery signal periodically and very intermittently. The reason for transmitting the discovery signal in the dormant state is to allow a terminal that has appeared, i.e., entered the service area of the cell in the dormant state, to measure the signal and determine whether to receive the service from the corresponding cell. Specifically, when there are many terminals requesting service from the cell in the dormant state, the cell transitions to the active state to serve the terminals.

In this embodiment of the present invention, the discovery signal is transmitted to make it possible for the cell in the dormant state transmission to the active state. When the discovery signal is not used, there is no way of waking up the cell in the dormant state, even when many terminals appear around the corresponding cell.

As described above, the transmission interval of the discovery signal (see reference number 610 of FIG. 6) is relatively long as compared to those of other signals and is determined according to the power conservation degree of the cell. The transmission interval of the discovery signal may be set by each cell, or according to discovery signal period information signaled by the macro cell, base station, or other device on the network.

It is also possible for the cell to configure the transmission interval of the discovery signal by selecting one of predetermined values depending on the intended power conservation degree. As described above, the transmission interval of the discovery signal is set to a large value as compared to those of other signals. However, if it is necessary for the terminal around the cell to receive the signal several times for signal strength measurement and cell search, the excessive long transmission interval degrades the entire cell performance.

If the signal strength is measured based on the discovery signals transmitted at a long interval, the accuracy of the signal strength is unreliable. Also, if it is necessary to receive the discovery signal several times to acquire the cell information, this causes handover delay or initial access delay, resulting in user inconvenience and degradation of system throughput. Specifically, the discovery signal has to be designed in the way of minimizing the number of discovery signal reception time for signal strength measurement or cell search so as to complete the corresponding operation as soon as possible.

Although It is most ideal to perform the signal strength measurement and cell search with the receipt of the discovery signal one time, the terminal may receive the discovery signal several times without exceeding a predetermined limit, if necessary.

By taking notice of the above description, if the discovery signal is transmitted using several OFDM symbols and several subcarriers with sufficient transmit power, it may be enough for the terminal to receive the discovery signal one time for the signal strength measurement and cell search. It is assumed that the discovery signal is designed in a way to complete signal strength measurement and cell search as soon as possible.

The above description has been directed to the case where the discovery signal is transmitted at a predetermined interval. After the cell in the dormant mode transitions to the active state, the base station may continue transmitting the discovery signal. The transmission interval in the active state may be identical to or different from the transmission interval in the dormant state. When the transmission intervals for the active and dormant states are different from each other, the transmission interval of the discovery signal for use in active state may be set to a fixed value, a value signaled by the macro cell or the base station, or a value selected by the cell among several candidate values.

FIG. 6 illustrates that the cell in the active state transmits the discovery signal and Cell-specific Reference Signal (CRS) defined in the legacy LTE system. Reference number 604 denotes the transmission of the legacy CRS at the interval of 1 ms as defined in LTE Rel-8, i.e., at the interval of a subframe, and the discovery signal at an interval much longer than 1 ms. In the legacy LTE Rel-8, although it is possible to perform signal strength measurement and cell search using CRS and SCH without the discovery signal, the reason for transmitting the discovery signal is to make it possible, if there is any terminal capable of performing signal strength measurement and cell search only with the discovery signal, for the corresponding terminal to receive only the discovery signal for the purpose of signal strength measurement and cell search.

If it is possible to perform the discovery signal-based signal strength measurement and cell search in all of the cells, the reason for use of the CRS decreases, and thus, it is allowable to set the transmission interval of CRS of the cell in the active state to a value greater than 1 ms. As illustrated by transmission 605 in FIG. 6, the CRS interval is 5 ms which is 5 times longer than legacy 1 ms. The CRS may be used for channel estimation for receiving data or synchronization between the cell and the terminal rather than signal strength measurement or cell search. The discovery signal proposed in this embodiment of the present invention is transmitted in a different pattern depending on whether the cell is in the active state or the dormant state.

In the network-controlled cell activation procedure, the operation state of the cell is transitioned from the dormant state to the active state under the control of the network.

Figure 7:
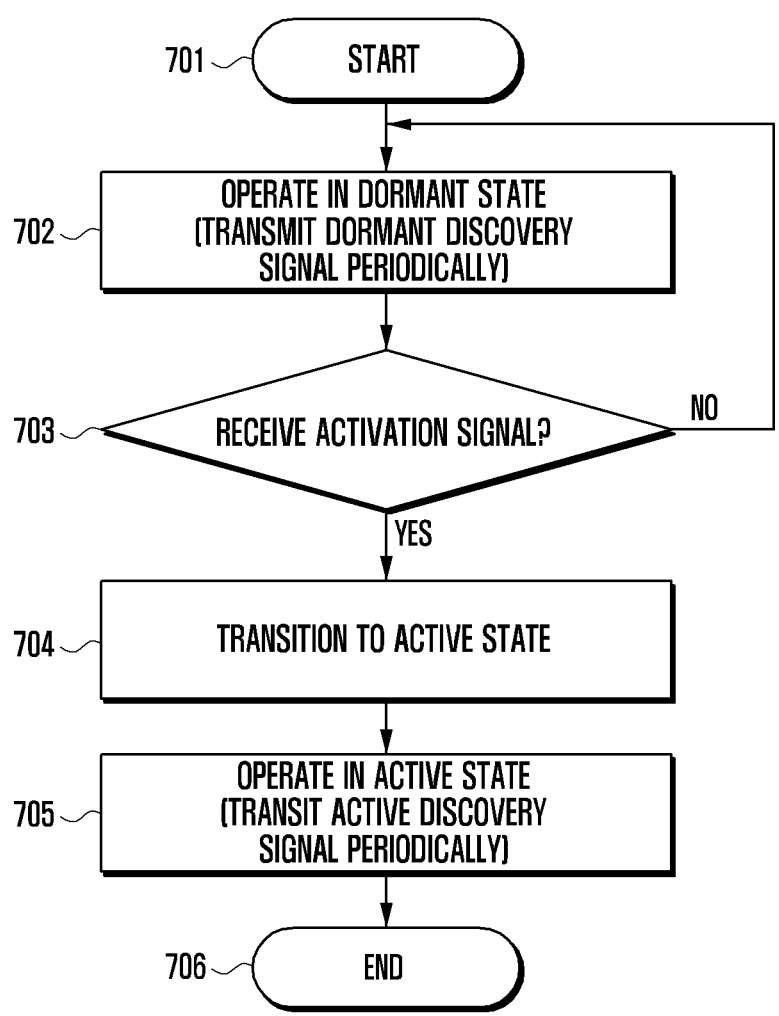
FIG. 7 is a flowchart illustrating the operation procedure of the small cell, according to an embodiment of the present invention.

FIG. 7 is a flowchart illustrating the operation procedure of the small cell, according to an embodiment of the present invention.

The small cell (this procedure is not limited to the small cell but applicable to a cell having a certain size) in the dormant state wakes up to transmit the discovery signal at a predetermined interval, while conserving power consumption without any transmission/reception operation. The discovery signal may include the cell ID and cell state information. The cell ID may be provided in any form that can be used for identifying the corresponding cell. The cell state information indicates whether the corresponding cell is in the active state or the dormant state. The cell state information makes it possible for a terminal to determine whether the corresponding cell is in the activate state or the dormant state. The discovery signal may carry the state information in various ways, e.g., using distinct signal strings (sequences) or distinct interleaving schemes depending on the cell state or encoding after designating 1 bit for state information.

The network-controlled cell activation procedure begins, in step 701. In step 702, it is determined that the cell operates in the dormant state. If the discovery signal is detected and received at a terminal, the terminal determines the cell state information included in the discovery signal to determine whether the cell transmitted the discovery signal is in the dormant state or active state. If the cell in the dormant state receives a signal related to the cell activation from the neighbor cell, the macro cell, or the base station, in step 703, the corresponding cell transitions from the dormant state to the active state for normal signal transmission/reception, in step 704. After entering the active state, the cell continues transmitting the discovery signal, in step 705. The discovery signal transmitted by the cell in the active state includes cell state information different from that of discovery signal transmitted in the dormant state.

Figure 8:
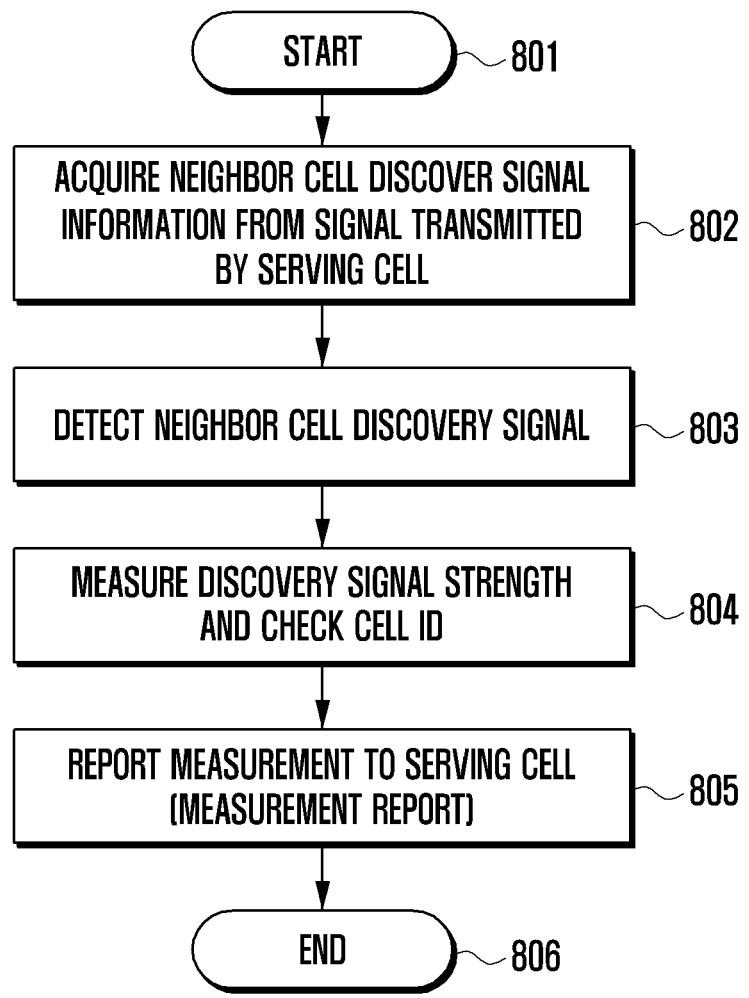
FIG. 8 is a flowchart illustrating the operation procedure of the terminal, according to an embodiment of the present invention.

FIG. 8 is a flowchart illustrating the operation procedure of the terminal, according to an embodiment of the present invention. In the terminal procedure of FIG. 8, the terminal receives the discovery signal transmitted by a certain small cell and sends the information on the discovery signal to the serving cell of the UE.

The terminal procedure starts, in step 801. The terminal receives the control information necessary for use in receiving the discovery signal transmitted by a neighbor cell adjacent to the serving cell, i.e., the information on the transmission interval of the discovery signal and offset, in step 802. The terminal receives the discovery signal of the neighbor cell using this information, in step 803.

This is advantageous in that the terminal attempts to receive the discovery signal, which is transmitted at a very long interval, at any available time but not always so as to conserve power consumption of the terminal.

If the discovery signal transmitted by the small cell is received successfully, the terminal measures the strength of the received discovery signal, and detects the cell ID, in step 804. The terminal determines the cell state information included in the discovery signal and determines whether the cell that has transmitted the discovery signal is in the active state or the dormant state. The terminal sends its serving cell the neighbor cell measurement information including the received signal strength of the discovery signal, cell ID, and cell state information, in step 805, and the procedure ends, in step 806.

Figure 9:
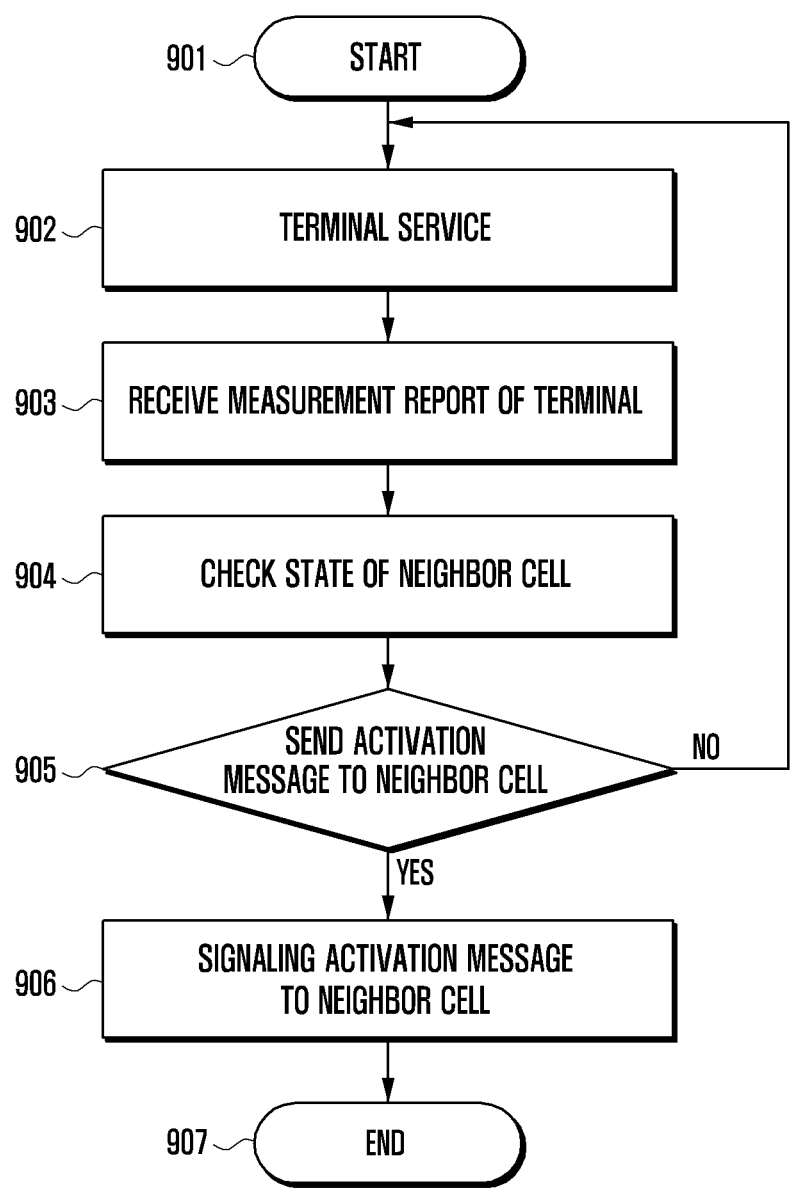
FIG. 9 is a flowchart illustrating the operation procedure of the serving cell, according to an embodiment of the present invention.

FIG. 9 is a flowchart illustrating the operation procedure of the serving cell, according to an embodiment of the present invention.

The serving cell provides service to the terminal, in step 902, and periodically receives a neighbor cell measurement report, transmitted by the terminal, while serving the terminal, in step 903. The serving cell checks the current state of the neighbor cell, i.e., the dormant state or the active state, based on the measurement report received from the terminal, in step 904, and determines whether to activate the neighbor cell, in step 905. If it is determined that the neighbor cell is not required to be activated, the serving cell returns the procedure to step 902, and continues to serve the terminal.

If it is determined that the neighbor cell is required to be activated, the serving cell sends the neighbor cell an activation message, in step 906, and the procedure ends, in step 907.

Whether to activate the neighbor cell may be determined in various ways, in step 905. If there is a terminal performing handover to the neighbor cell, it is required to activate the neighbor cell. Typically, the serving cell makes a handover decision based on the measurement information reported by the terminal. If the measurement information indicates two neighbor cells available for the handover, one in the active state and the other in the dormant state, it is preferred to perform handover to the cell in the active state without activating the cell in the dormant state. Accordingly, in order to accomplish the above-described method, embodiments of the present invention propose a method of transmitting a distinct discovery signal depending on the state of the cell.

Figure 10:
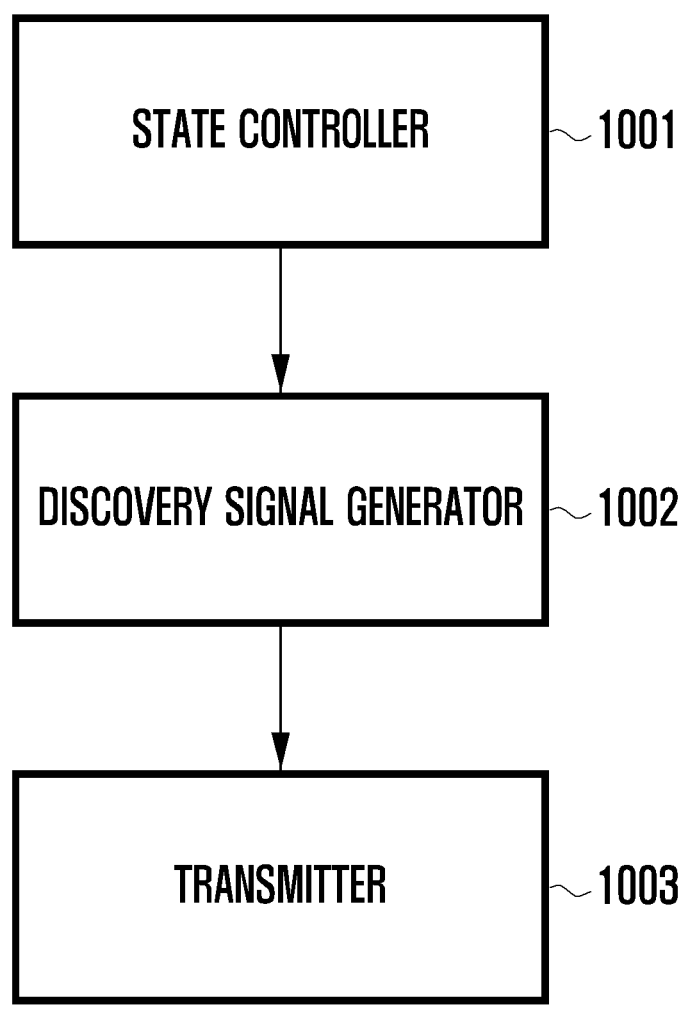
FIGS. 10 and 11 are block diagrams illustrating the configurations of the cell and the terminal, according to an embodiment of the present invention.
Figure 11:
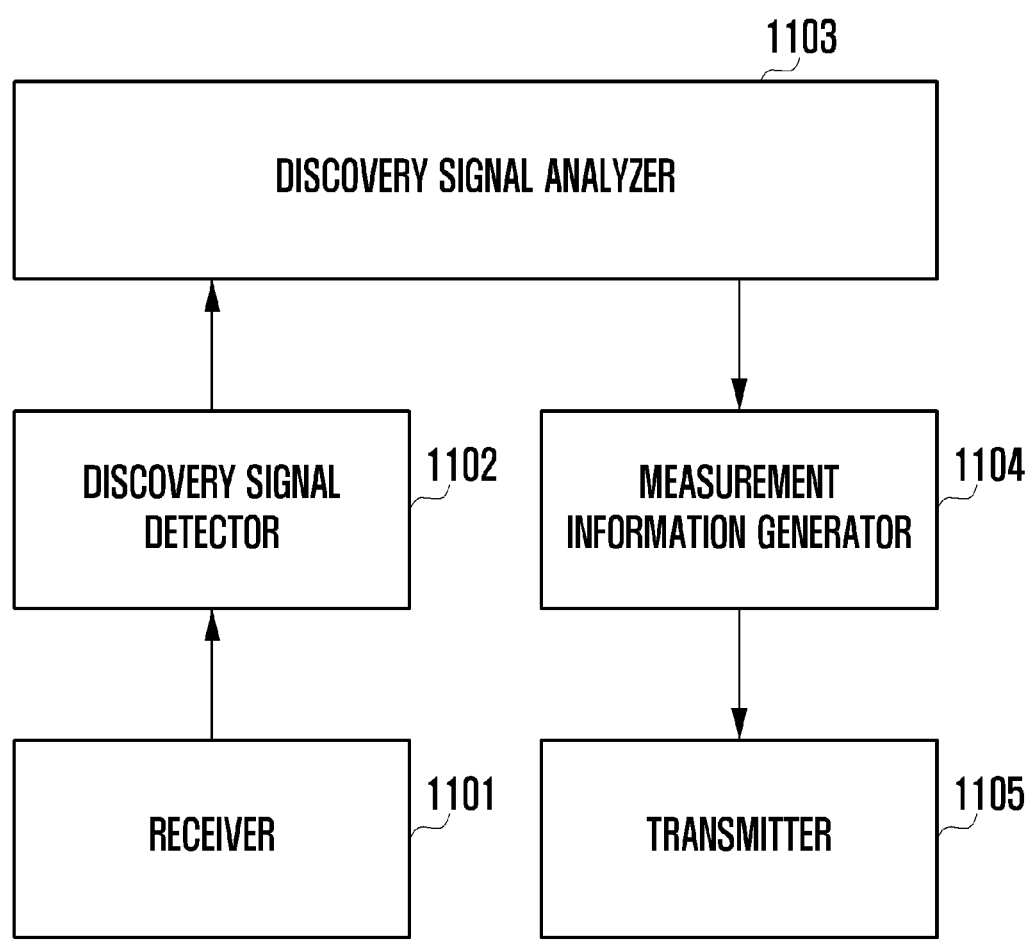

FIGS. 10 and 11 are block diagrams illustrating the configurations of the cell and the terminal, according to an embodiment of the present invention.

In FIG. 10, a state controller 1001 of the cell determines the state of the cell and controls a discovery signal generator 1002 to generate the discovery signal indicating the current state of the cell. The discovery signal is transmitted periodically by means of a transmitter (or transceiver) 1003.

The state controller (or controller) 1001 controls transmission of the discovery signal periodically or non-periodically, determines whether a cell activation signal is received from the node controlling the cell, and controls transition of the operation state of the cell to the active state in response to the cell activation signal.

In FIG. 11, a receiver 1101 of the terminal receives a signal, and a discovery signal detector 1102 detects the discovery signal. A discovery signal analyzer 1103 determines whether the cell that has transmitted the discovery signal is in the active state or the dormant state based on the received discovery signal. The measurement information is generated based on the determination result at a measurement information generator 1104. A transmitter (or transceiver) 1105 transmits the measurement information to the serving cell of the terminal.

In the terminal-controlled cell activation procedure, the operation state of a cell is transitioned from the dormant state to the active state according to the operation of one or more terminals near or around the cell in the dormant state. The basic procedure of this embodiment of the present invention is performed in such a way that the terminal that has received the discovery signal from the cell in the dormant state transmits an uplink signal to the base station at a predetermined timing, if it determines to activate the corresponding cell. The cell performs cell activation based on the signal transmitted by the terminal.

The activation signal must be transmitted in uplink on a resource determined between the cell and the base station. Specifically, the terminal transmits the activation signal on the time-frequency resource after a certain time determined based on the received discovery signal, and the cell receives the activation signal using the same resource. The resource for transmitting the activation signal is determined based on the discovery signal.

Figure 14:
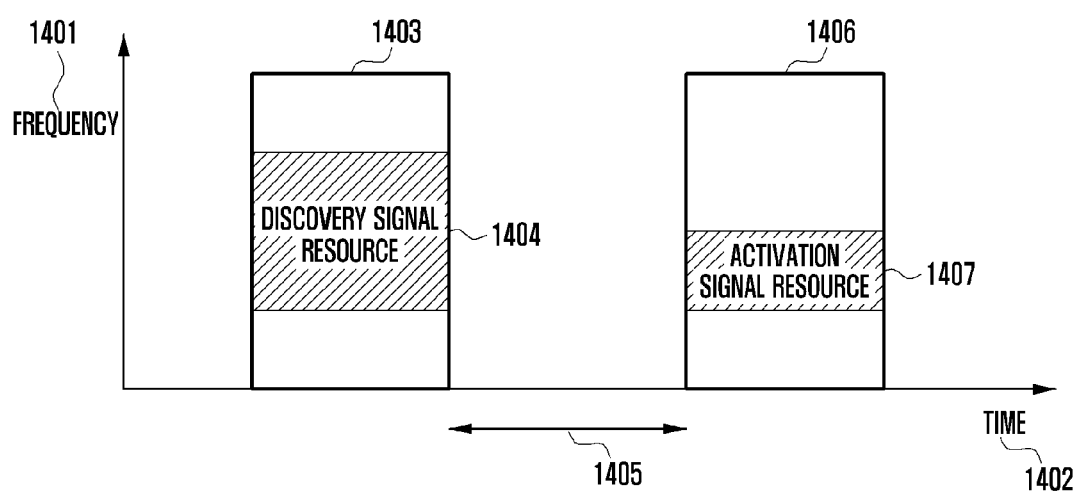
FIG. 14 is a diagram illustrating the relationship between the discovery signal resource and the activation signal resource, according to an embodiment of the present invention.

FIG. 14 is a diagram illustrating the relationship between the discovery signal resource and the activation signal resource, according to an embodiment of the present invention.

Since embodiments of the present invention are directed to the LTE system based on OFDMSingle Carrier-Frequency Division Multiple Access (SC-FMDA), FIG. 14 illustrates a frequency resource 1401 and a time resource 1402. The frequency resource is defined with the positions and number of subcarriers, and the time resource is defined with the number of OFDM/SC-FDMA symbols. The cell transmits the discovery signal using the resource as denoted by reference number 1404 in an entire resource 1403. If the discovery signal is received, the terminal transmits the activation signal using an uplink resource 1407 in an entire resource 1406, after the elapse of a predetermined time duration 1405.

The resource used for transmitting the activation signal is selected depending on the cell ID included in the discovery signal to guarantee orthogonality of the resource spaces for the different cells. When the activation signal resource is determined differently depending on the cell ID, the terminal checks the cell ID in the received discovery signal to determine the activation signal resource and then transmits the activation signal using the resource. Specifically, the resource for transmitting the activation signal may be predetermined according to the cell ID included in the discovery signal.

Figure 12:
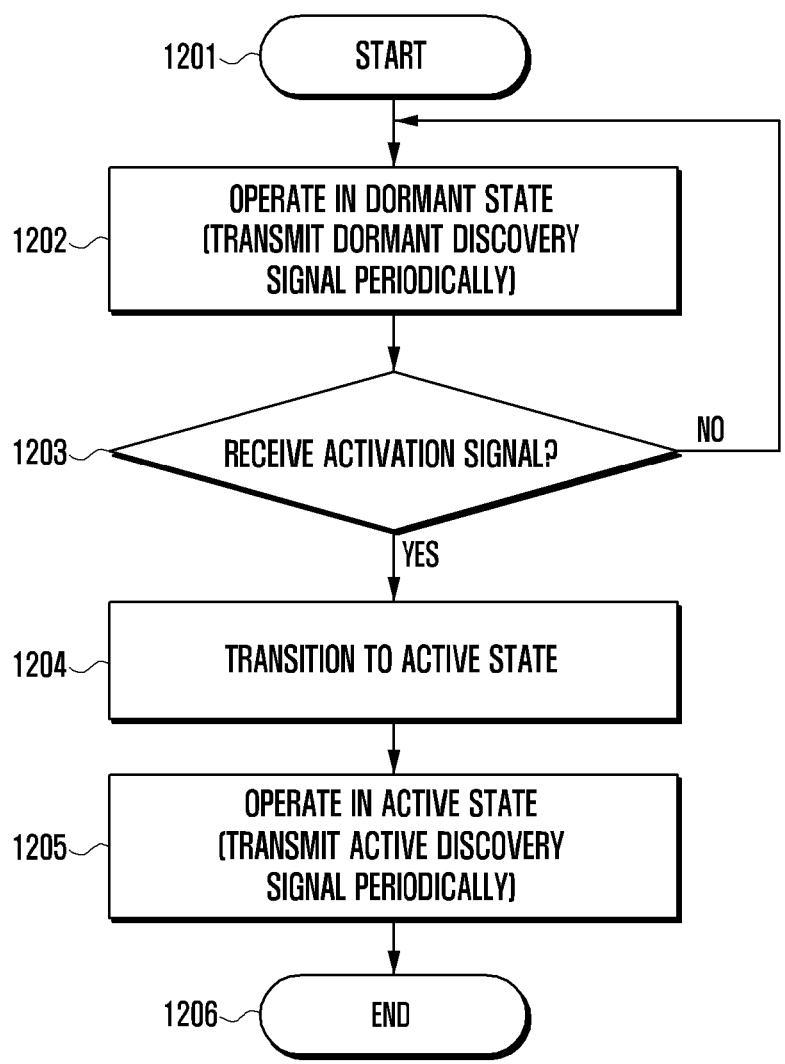
FIG. 12 is a flowchart illustrating the operation procedure of the small cell, according to an embodiment of the present invention.

FIG. 12 is a flowchart illustrating the operation procedure of the small cell, according to an embodiment of the present invention.

The small cell (this procedure is not limited to the small cell, but is applicable to a cell having a certain size) in the dormant state wakes up to transmit the discovery signal at a predetermined interval, while conserving power consumption without any transmission/reception operation.

The discovery signal includes different information depending on the operation state of the cell. Specifically, if the discovery terminal is detected and received, the terminal determines whether the cell that has transmitted the discovery signal is in the dormant state or the active state.

The procedure begins, in step 1201, and it is determined that the cell is in the dormant state, in step 1202. The cell attempts to receive the activation signal that may be transmitted by one or more terminals in uplink right after the transmission of the discovery signal, and determines whether the activation signal is received, in step 1203. If no activation signal is received at operation 1203, the cell returns the procedure to step 1202 and remains in the dormant state.

Otherwise, if the activation signal is received in step 1203, the cell transitions its operation state from the dormant state to the active state to allow for normal signal transmission/reception, in step 1204.

After entering the active state, the cell continues transmitting the discovery signal, in step 1205. However, the discovery signal transmitted in the active state includes the information indicating that the cell is operating in the active state, unlike the discovery signal transmitted in the dormant state. The receipt of the activation signal may be determined in various ways, in step 1203 and, in this embodiment of the present invention, the determination is made based on the size of the received signal.

If the terminal transmits the activation signal to the cell which has transmitted the discovery signal using the predetermined resource, and if the terminal is close to the cell so as to maintain good channel quality, the received signal strength of the activation signal increases. The terminal may use an on-off Keying (OOK) method for transmitting the activation signal. The cell uses the energy detection method for receiving the activation signal and, if the received signal strength of the activation signal is greater than a predetermined threshold value, determines the receipt of the activation signal so as to transition to the active state.

If more than one terminal transmits the activation signal on the same resource, it may be determined that the multiple terminals request the cell for the service, and the activation signals transmitted by multiple terminals may boost the reception energy so as to increase the probability of transitioning to the active state.

Figure 13:
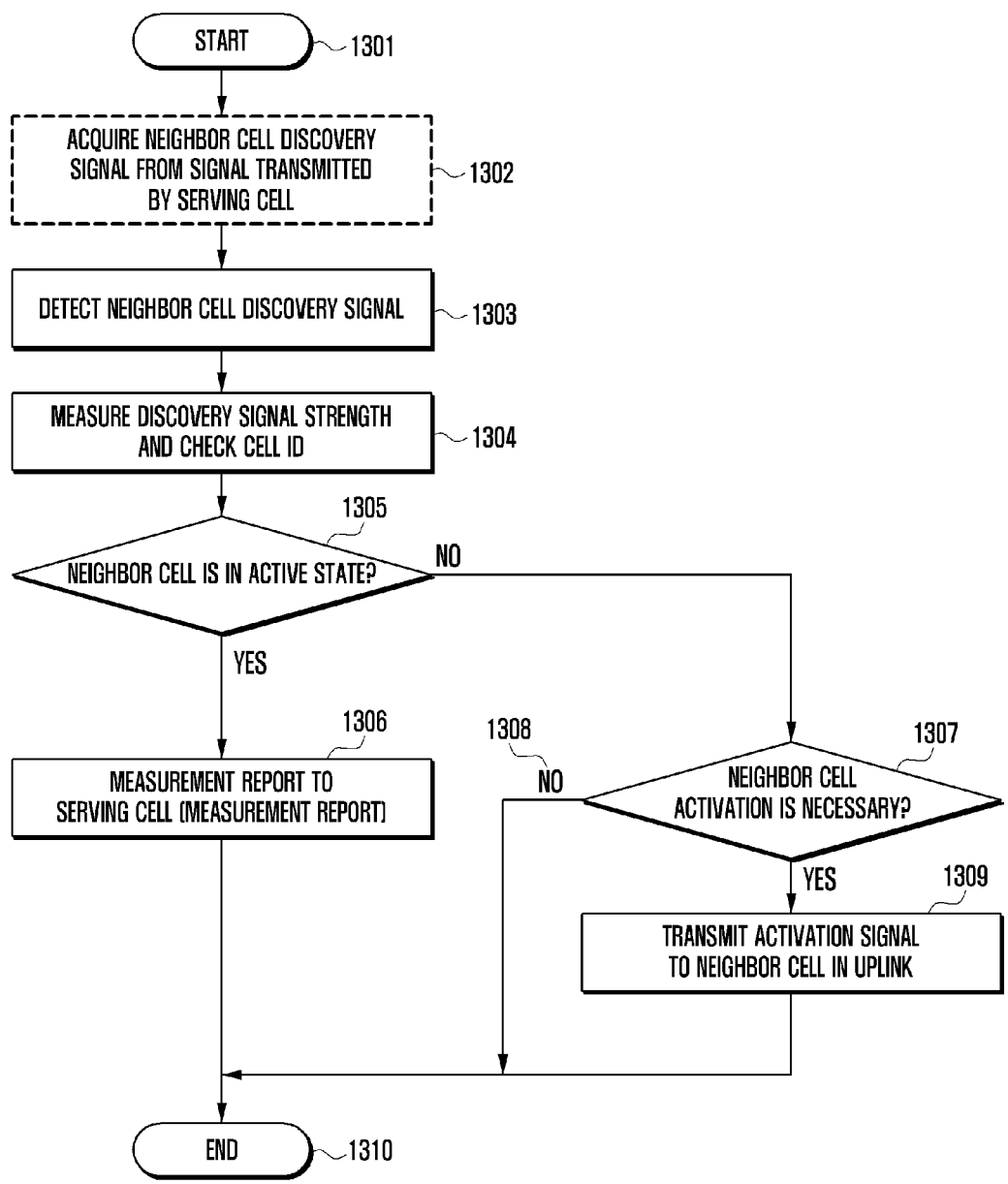
FIG. 13 is a flowchart illustrating the operation procedure of the terminal, according to an embodiment of the present invention.

FIG. 13 is a flowchart illustrating the operation procedure of the terminal, according to an embodiment of the present invention.

The terminal receives the discovery signal transmitted by a small cell, and sends the information on the discovery signal to the serving cell of the terminal.

The UE procedure begins, in step 1301. The terminal receives the information on the discovery signal of the small cell, i.e., the discovery signal transmission interval and offset information, from the serving cell, in step 1302. However, step 1302 may also be omitted.

The terminal detects the discovery signal of the neighbor cell, in step 1303. If the discovery signal transmitted by the small cell is received successfully, the terminal measures the signal strength of the discovery signal and checks the cell ID, in step 1304. The terminal determines whether the cell that has transmitted the discovery signal is in the active state or the dormant state, in step 1305.

If it is determined that the cell that has transmitted the discovery signal is in the active state, in step 1305, the terminal reports the measured cell information to the serving cell, in step 1306, and the procedure ends, in step 1310.

If it is determined that the cell is in the dormant state, in step 1305, the terminal determines whether it is necessary for the cell in the dormant state to transition to the active state based on the strength of the discovery signal according to a predetermined rule, in step 1307. The criterion for determining the state transition may be the strength of the discovery signal and, if the received signal strength of the discovery signal becomes greater than or equal to a predetermined threshold, the terminal determines that activation of the cell is necessary.

If it is determined that the activation of the cell is not necessary, in step 1307, the terminal ends the procedure, in step 1310.

If it is determined that the activation of the cell is necessary, in step 1307, the terminal transmits the activation signal to the cell, in step 1309, and ends the procedure, in step 1310.

Figure 15:
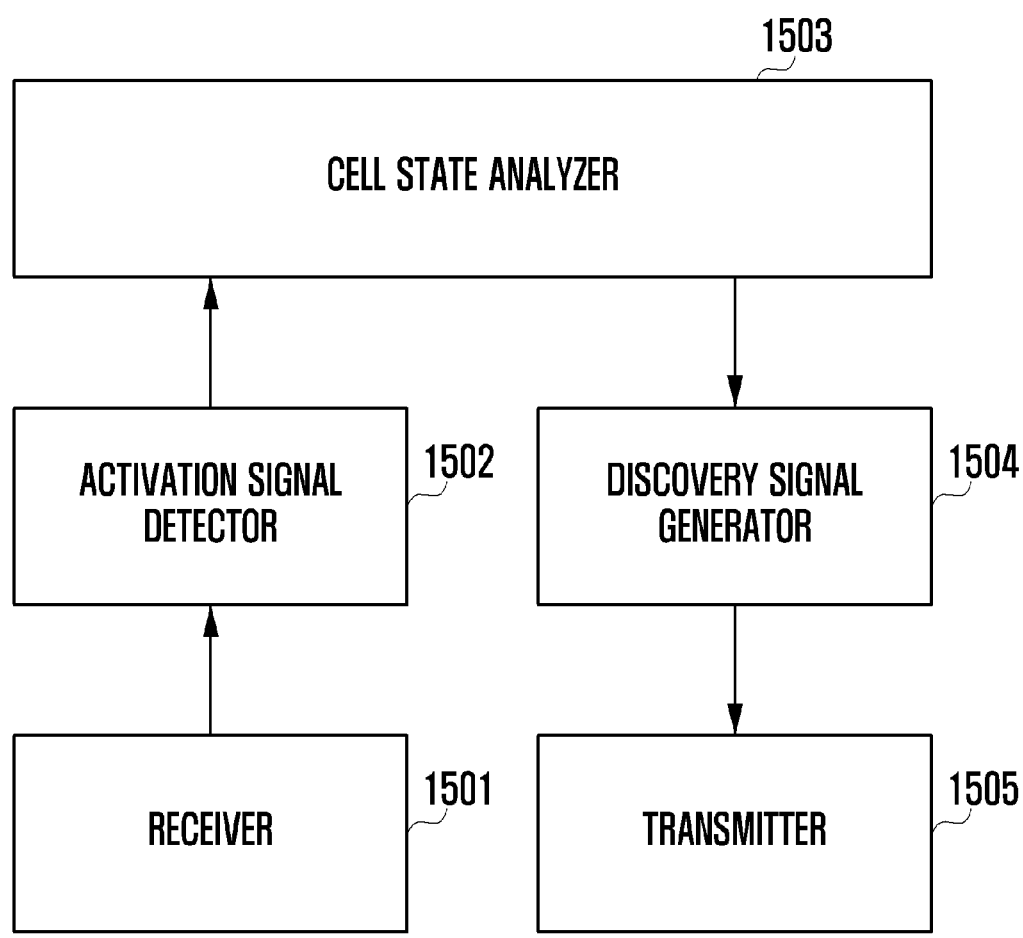
FIGS. 15 and 16 are diagrams illustrating the configuration of the cell in the dormant state and the terminal, according to an embodiment of the present invention.
Figure 16:
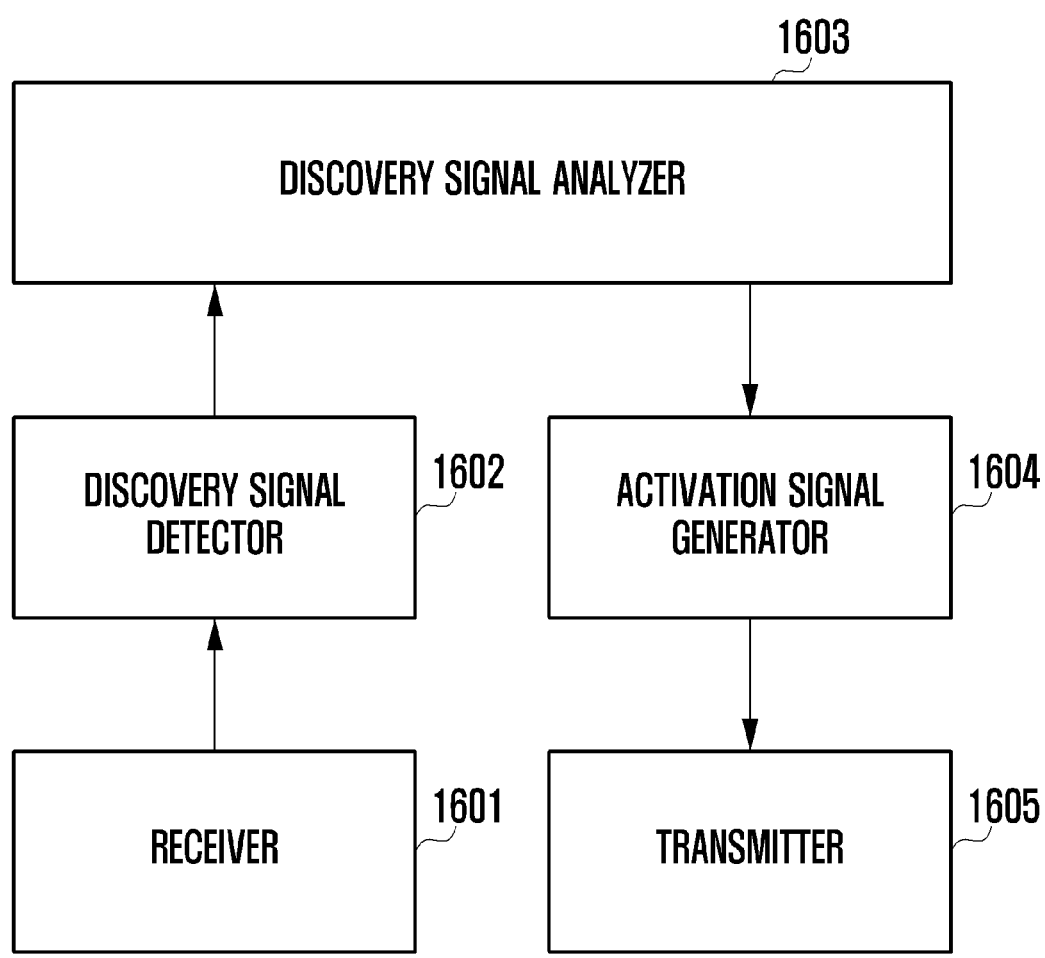

FIGS. 15 and 16 are diagrams illustrating the configuration of the cell in the dormant mode and the terminal, according to an embodiment of the present invention.

In FIG. 15, the cell in the dormant state receives a signal by means of a receiver 1501, and detects the activation signal by means of an activation signal detector 1502. The detected signal is input to a cell state analyzer 1503, which determines whether to transition the cell state to the active state based on the strength of the activation signal. A discovery signal generator 1504 generates the distinct discovery signal depending on the operation state of the cell, i.e., active state or dormant state, and a transmitter 1505 transmits the discovery signal.

In FIG. 16, the terminal receives signals by means of a receiver 1601, and detects the discovery signal among the received signals by means of a discovery signal detector 1602. The terminal inputs the discovery signal to a discovery signal analyzer 1603. The discovery signal analyzer 1603 determines whether the received signal strength of the discovery signal is greater than or equal to a predetermined threshold and, if so, controls an activation signal generator 1604 to generate the activation signal. The activation signal is transmitted by means of a transmitter 1605.

The method and apparatus for controlling transition of the operation state of a base station between the dormant and active states, according to embodiments of the present invention, are advantageous for power conservation of the base station and eco-friendly communication.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for activating a cell, by the cell, in a wireless communication system, the method comprising the steps of
   transitioning an operation state of the cell from an active state to a dormant state;
   transmitting a discovery signal including cell state information indicating that the operation state of the cell is the active state or the dormant state;
   determining whether a cell activation signal is received from a node that controls the cell; and
   transitioning the operation state of the cell from the dormant state to the active state, if the cell activation signal is received.

2. The method of claim 1, wherein the discovery signal further includes a cell identifier (ID).

3. A method for activating a cell by a terminal in a wireless communication system, the method comprising the steps of:
   receiving, from a serving cell, control information for use in receiving a discovery signal of the cell;
   receiving, from the cell, the discovery signal including cell state information based on the control information, the cell state information indicating an operation state of the cell is an active state or a dormant state;
   generating neighbor cell measurement information based on the discovery signal; and
   transmitting the neighbor cell measurement information to the serving cell,
   wherein the operation state of the cell is transitioned from the dormant state to the active state, if a cell activation signal, which is generated by the serving cell based on the neighbor cell measurement information, is transmitted to the cell.

4. The method of claim 3, wherein the discovery signal further includes a cell identifier (ID), and the neighbor cell measurement information includes at least one of received signal strength of the discovery signal, the cell ID, and the cell state information.

5. A method for activating a cell by a serving cell in a wireless communication system, the method comprising the steps of:
   receiving, from a terminal served by the serving cell, neighbor cell measurement information generated based on a discovery signal, the discovery signal being transmitted from the cell to the terminal and including cell state information that indicates that an operation state of the cell is an active state or a dormant state;
   checking the operation state of the cell based on the neighbor cell measurement information;
   determining whether to activate the cell, when the cell is in the dormant state; and
   transmitting an activation message from the serving cell to the cell, if it is determined to activate the cell.

6. The method of claim 5, wherein determining whether to activate the cell comprises determining to activate the cell, if there is a terminal performing handover to the cell.

7. A cell for activating the cell in a wireless communication system, the cell comprising:
   a transceiver configured to transmit and receive signals to and from a terminal and another cell; and
   a controller configured to transition an operation state of the cell from an active state to a dormant state, transmit a discovery signal including cell state information that indicates that the operation state of the cell is the active state or the dormant state, determine whether a cell activation signal is received from a node that controls the cell, and transition the operation state of the cell from the dormant state to the active state, if the cell activation signal is received.

8. The cell of claim 7, wherein the discovery signal further includes a cell identifier (ID).

9. A terminal for activating a cell in a wireless communication system, the terminal comprising:
   a transceiver configured to transmit and receive signals; and
   a controller configured to control reception of control information for use in receiving a discovery signal of the cell from a serving cell, reception of the discovery signal, based on the control information including cell state information that indicates that an operation state of the cell is an active state or a dormant state, generation of neighbor cell measurement information based on the discovery signal, and transmission of the neighbor cell measurement information to the serving cell,
   wherein the operation state of the cell is transitioned from the dormant state to the active state, if a cell activation signal, which is generated by the serving cell based on the neighbor cell measurement information, is transmitted to the cell.

10. The terminal of claim 9, wherein the discovery signal further includes a cell identifier (ID), and the neighbor cell measurement information includes at least one of received signal strength of the discovery signal, the cell ID, and the cell state information.

11. A cell for activating a neighbor cell in a wireless communication system, the cell comprising:
   a transceiver configured to transmit and receive signals to and from a terminal or another cell; and
   a controller configured to control reception, from the terminal served by the cell, of neighbor cell measurement information generated based on a discovery signal, the discovery signal being transmitted from the neighbor cell to the terminal and including cell state information that indicates that an operation state of the neighbor cell is an active state or a dormant state, checking of the operation state of the neighbor cell based on the neighbor cell measurement information, determination of whether to activate the neighbor cell if the neighbor cell is in the dormant state, and transmission of an activation message to the neighbor cell if it is determined to activate the neighbor cell.

12. The cell of claim 11, wherein the controller determines to activate the neighbor cell, if there is a terminal performing handover to the neighbor cell.

\* \* \* \* \*